United States Patent
Reichert

(10) Patent No.: US 9,389,047 B2
(45) Date of Patent: Jul. 12, 2016

(54) BALLISTIC RESISTANT ARMOR ARTICLE

(71) Applicant: E I DU PONT DE NEMOURS AND COMPANY, Wilmington, DE (US)

(72) Inventor: David L Reichert, Boothwyn, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 531 days.

(21) Appl. No.: 13/871,121

(22) Filed: Apr. 26, 2013

(65) Prior Publication Data

US 2014/0318358 A1    Oct. 30, 2014

(51) Int. Cl.
*B32B 9/00* (2006.01)
*B32B 27/18* (2006.01)
*F41H 5/007* (2006.01)
*F41H 5/04* (2006.01)

(52) U.S. Cl.
CPC .................. *F41H 5/04* (2013.01); *F41H 5/007* (2013.01); *B32B 9/00* (2013.01); *B32B 27/18* (2013.01); *F41H 5/0421* (2013.01); *F41H 5/0428* (2013.01)

(58) Field of Classification Search
None
See application file for complete search history.

(56) References Cited

U.S. PATENT DOCUMENTS

| 6,418,832 | B1* | 7/2002 | Colvin ...................... F41H 5/04 2/2.5 |
| 7,082,868 | B2 | 8/2006 | Reichman |
| 2011/0003112 | A1* | 1/2011 | Krueger ................ F41H 5/0485 428/114 |

OTHER PUBLICATIONS

Tracy V. Wilson, How Liquid Body Armor Works, Science. howstuffworks.com.
Norman Joseph Wagner, The Ballistic Impact Characteristics of Kevlar Woven Fabrics Impregnated with a Colloidal Shear Thickening Fluid, Journal of Material Science, Jun. 2003.

* cited by examiner

*Primary Examiner* — Ramsey Zacharia

(57) ABSTRACT

This invention pertains to a ballistic resistant article comprising at least one first layer facing a projectile and at least one second layer adjacent to the at least one first layer and facing an object to be protected wherein, under a ballistic event, the at least one first layer is capable of undergoing a shock induced non-reversible phase transformation.

9 Claims, 2 Drawing Sheets

BALLISTIC RESISTANT ARMOR ARTICLE

BACKGROUND

1. Field of the Invention

This invention pertains to the field of ballistic resistant hard armor articles.

2. Description of Related Art

U.S. Pat. No. 7,082,868 to Reichman discloses a lightweight armor with repeat hit capability including at least one layer of material that absorbs energy upon being impacted by an object through a reversible phase change and/or an elastic strain deformation of at least 5%. Once the energy of the object has been absorbed the layer of material returns to its original shape, thereby resulting in an armor with repeat hit capabilities.

U.S. Pat. No. 6,418,832 to Colvin describes a body armor system having improved impact energy absorbing characteristics including a projectile penetrant inhibiting layer and an impact energy absorbing layer positioned in overlying relation to one side of the projectile penetrant inhibiting layer such that the impact energy absorbing layer is adapted to absorb the impact energy from an incoming projectile. An anti-spalling layer is positioned on the opposite side of the projectile impact inhibiting layer. In another aspect of the invention, the impact energy absorbing layer contains foam to further enhance impact energy absorption. Additionally, a temperature stabilizing means such as a phase change material is placed within the impact energy absorbing layer and provides thermal regulation. The phase change material may be bulk, microencapsulated or macroencapsulated and may be placed directly within the impact energy absorbing layer or within the foam as desired.

There remains an ongoing need to provide effective low weight hard armor ballistic protection solutions.

SUMMARY OF THE INVENTION

This invention pertains to a ballistic resistant article comprising at least one first layer facing a projectile and at least one second layer adjacent to the at least one first layer and facing an object to be protected wherein, under a ballistic event, the at least one first layer is capable of undergoing a shock induced non-reversible phase transformation.

DETAILED DESCRIPTION

Ballistic Article

Figure 1:
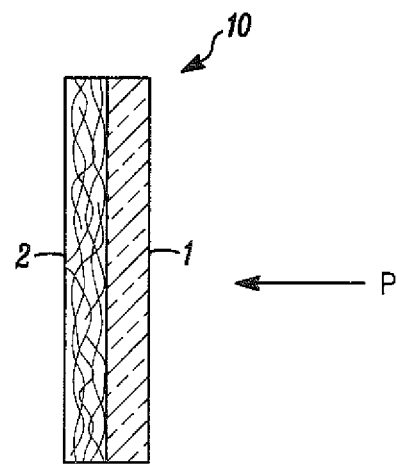
FIG. 1 shows a section through an article comprising a first layer and a second layer.

FIG. 1 shows generally at 10, a ballistic article comprising at least one first layer 1 facing a projectile "P" traveling in the direction shown by the arrow and at least one second layer 2 adjacent to the at least one first layer 1 and facing an object to be protected. Under a ballistic event, the at least one first layer is capable of undergoing a shock induced non-reversible phase transformation.

Figure 2:
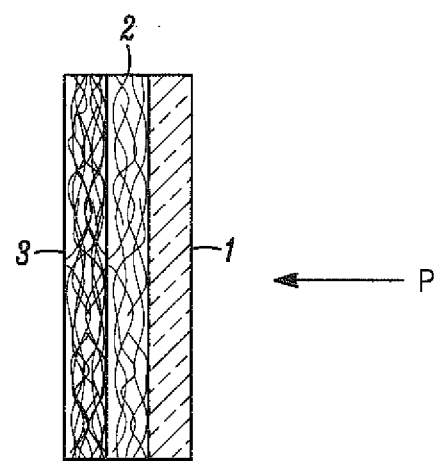
FIG. 2 shows a section through an article comprising a first layer, a second layer and a third layer.

The ballistic article may optionally further comprise at least one third layer, the third layer being adjacent to the at least one second layer and facing an object to be protected. That is to say that the at least one third layer is furthest away from the incoming projectile. The at least one third layer is shown as 3 in FIG. 2.

First Layer

The first layer, which faces the projectile, comprises a material capable of undergoing a shock induced non-reversible phase transformation. One such material is hBN, hexagonal boron nitride, available from Saint-Gobain Ceramic Materials, Amherst, N.Y. Under a ballistic event, the hBn transforms to cBN, cubic boron nitride, or wBN, wurtzitic boron nitride. In some embodiments, the first layer is in the form of a compacted plate having a thickness of from 0.1 to 75 mm or from 0.5 to 75 mm or even from 1 to 75 mm. In some other embodiments, the plate thickness is from 0.1 to 5 mm or from 0.5 to 5 mm or even from 1 to 5 mm. In a further embodiment, the plate thickness is from 1 to 2 mm.

In some embodiments, the first layer may comprise at least 30 weight percent of the non-reversible phase transformable material. In other embodiments the first layer may comprise at least 45 or at least 95 or even at least 98 weight percent of the non-reversible phase transformable material. Other components of the first layer may include zirconium oxide or borosilicate glass. These compositions are suitable in applications where the outer surface is flat or where a curved component comprising the non-reversible phase transformable material and the second layer can be co-produced in a single or multi-step manufacturing process without any gaps between the first layer and the second layer, for example by co-firing.

In other embodiments, the non-reversible phase transformable material is blended with a polymeric resin the resin being present in any suitable amount. The resin may be a thermoset or thermoplastic resin. A thermoplastic polymer is preferred. In some embodiments, the polymer may comprise up to 70 or 80 or 85 weight percent of the blend. In other embodiments the polymer may comprise up to 10 weight percent or up to 30 weight percent of the blend or even up to 50 weight percent of the blend. Suitable thermoplastic materials include polyester such as is available from E. I. DuPont de Nemours and Company, Wilmington, Del. under the tradename Hytrel or polymethylmethacrylate (PMMA) available from Evonik Industries, Essen, Germany. Such blends are particularly suitable for use in making contoured components for example by a molding process.

Second Layer

The second layer is adjacent to the first layer and faces the object to be protected. The second layer may comprise metal, ceramic, fibrous yarn or non-filamentary polymeric tape, the fibrous yarn or non-filamentary polymeric tape having a tenacity of at least 10 g/dtex (9 g/denier).

Suitable metals for the second layer include steel, aluminum or titanium, preferably in the form of a plate. Small holes in metal armor plates may be used to reduce weight in the second layer. In some embodiments, the metal is in the form of woven fabric or knit such as chain mail.

Preferable ceramic materials for the second layer are those typically used in armor designs such as alumina, boron carbide, titanium diboride and silicon carbide. A preferable form is a tile.

The fibrous yarn for the second layer may be of polymeric or inorganic composition. Suitable yarns include those of glass, carbon, aromatic polyamide, aromatic copolyamide, ultra high molecular weight polyethylene (UHMWPE) or polyazole. A preferred aromatic polyamide yarn is p-aramid such as can be obtained from E.I. DuPont de Nemours and Company, Wilmington, Del. under the tradename Kevlar® or from Teijin Aramid, Conyers, Ga. under the tradename Twaron®. Suitable UHMWPE fibers are available from DSM Dyneema LLC, Stanley, N.C. under the tradename Dyneema or from Honeywell Advanced Fibers and Composites, Morristown, N.J. under the tradename Spectra.

A suitable non-filamentary tape for the second layer is ultra-high molecular weight polyethylene (UHMWPE). The tape may be used in any suitable width. Exemplary widths up to 1600 mm are common. The tapes may be cross-piled, preferably with an adhesive, to form bi-directional laminates. In some embodiments, such laminates have an areal weight of from 110 to 170 grams per square meter (gsm). Tapes may be obtained from DuPont under the tradename Tensylon®, from Teijin, Arnhem, Netherlands under the tradename Endumax® or from DSM Dyneema BV, El Urmond, Netherlands under the tradename BT10.

The first layer may be attached to the second layer by an adhesive or other suitable means.

Third Layer

An optional at least one third layer is adjacent to the at least one second layer and faces the object to be protected.

In some embodiments, the third layer comprises filaments of aromatic polyamide, aromatic copolyamide, ultra high molecular weight polyethylene (UHMWPE), polyazole, glass, ceramic or non-filamentary UHMWPE tape. Preferably, the tenacity of the filaments is at least 10 g/dtex. Suitable aromatic polyamides are available from DuPont under the tradename Kevlar or from Teijin Aramid under the tradename Twaron. Exemplary UHMWPE fibrous tapes are available from Honeywell, Morristown, N.J. under the tradename Spectra or from DSM under the tradename Dyneema. An example of fibrous polyazole is Zylon, available from Toyobo Co. Ltd., Osaka, Japan. Glass fibers may be obtained from Owens Corning Composite Materials LLC, Toledo, Ohio under the tradename ShieldStrand R. Any suitable ceramic material, such as boron carbide, silicon carbide, high purity aluminum oxide, titanium diboride, aluminum nitride or silicon nitride or sintered silicon carbide and sintered silicon nitride ceramics may be used. Ceramic fibers are available from 3M Ceramic Textiles and Composites, St. Paul, Minn. under the tradename Nextel. The filaments may be in the form of a undirectional fabric, a woven fabric, a knit or a non-woven fabric. In a non-woven fabric, the filaments are randomly oriented. Another form of fabric is a felt. Combinations of different fabric types or blends of different fibers may be utlized. In some embodiments, some or all of the at least one third layers may be coated with a resin such that the resin flows between the filaments. The resin may be thermoset or thermoplastic. Suitable resins include epoxy, polyurethane, phenolic and polyvinylybutyral. Preferably, a thermoset resin is cured to form a rigid structure.

In some embodiments, the third layer comprises non-filamentary UHMWPE tapes as have been previously described.

In some other embodiments a core structure may also form part of the third layer. Suitable core structures include foam or honeycomb. Preferably the foam is a closed cell foam. Polyurethane is a suitable foam material. In some embodiments the foam may include fillers such as ceramic in the form of particles or fibers, or glass in the form of frits or chopped fiber. Nanoparticles, such as those available from Nanophase Technologies Co., Romeoville, Ill., may be added to the foam.

Any suitable honeycomb core may be used. Aluminum core is particularly suitable. The cells of the core may be filled with a particulate material such as ceramic powders, ceramic microspheres, glass microspheres, silicon carbide, granulated garnet or other hard gemstones. Combinations of such particulate materials may also be used. The honeycomb may also be filled with foam. Peferably the core has facesheets adhering to the outer surfaces of the core structure. The face sheets may be of metal or fiber reinforced plastic.

The at least one third layer may comprise combinations of different materials, for example a core and a plurality of woven fabrics.

Preferably, the third layer is attached to the second layer by an adhesive or other suitable means.

The total weight of the assembly comprising the at least one first, second and third layers will be determined by the threat protection required for a specific article and will be a function of factors such as material choice, fabric design and resin and adhesive selection.

Figure 3:
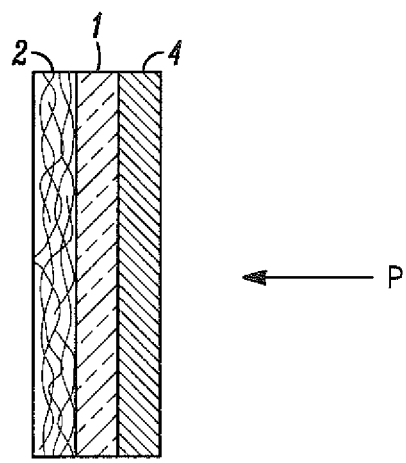
FIGS. 3 and 4 show sectional views of further embodiments of the invention.
Figure 4:
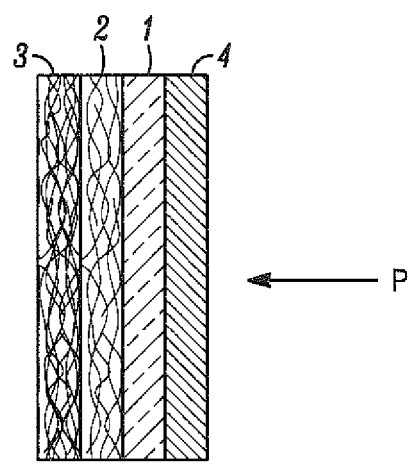

A further embodiment of the invention is to provide a multi-hit protection layer or shield positioned in front of the first layer 1. This is shown at 4 in FIGS. 3 and 4. The purpose of the shield is to retain in place any shattered fragments of the first layer created during a first shot and thus preserve the contribution of the first layer when hit by further projectiles. The shield may be a composite of fiber and resin or just a resinous layer. Suitable fibers include carbon fiber from polyacrylonitrile precursor, glass fiber, para-aramid fiber, ultra-high molecular weight polyethylene fiber or tape. Suitable resins for the composite include epoxy, phenolic, ionomeric and polyvinylbutyral. The multi-hit shield can also be fabricated from thermoplastic polyurethane (TPU.). The TPU can additionally be enhanced with filler such as nanosized materials like carbon or aramid or pulp from carbon or aramid. The thickness of the multi-hit layer will vary for different armor design requirements. Increasing the thickness of the multi-hit layer beyond that necessary for high impact bullet resistance can provide additional protection to the first layer from non-ballistic impacts such as being dropped. Non-ballistic impacts can cause damage to the first layer.

Another means of providing protection against low speed impact is to position a layer of end grain balsa, foam, honeycomb or foam filled honeycomb facing the projectile in front of either the first layer 1 or the multi-hit layer 4. A preferred foam is closed cell foam. A preferred honeycomb is aluminum honeycomb.

EXAMPLES

The first layer comprised ceramic tile having nominal dimensions of 101 mm×101 mm×12.7 mm thick. Three different ceramic compositions were tested, Combat® A hBN, Combat® HP hBN and Combat® ZSBN all of these being obtained from Saint Gobain. Each first layer was bonded under heat and pressure to a 6.3 mm first steel plate of Omega Armor steel from Kloeckner Metals (Temtco Steel, Armor Division), Apache Junction, Ariz. using Bynel® adhesive available from DuPont. An additional 6.3 mm thick Omega Armor steel plate was clamped behind the first steel plate. The entire assembly was clamped to a frame with the first layer facing the projectile and shot with an M2 AP round at 868+15 m/s (2850+50 f/s). All three types of first layer tile caused the core of the bullet to shatter and resulted in a depth of penetration into the first steel plate of 4 mm.

A control test was performed by shooting an M2 AP round at 868+15 m/s into two clamped 6.3 mm thick plates of Omega Armor steel that did not comprise a first layer of ceramic tile. The core of the bullet penetrated both plates and the tip of the undamaged core protruded 5.5 mm out the back of the second steel plate, the second plate being the plate furthest away from the incoming bullet.

This test demonstrates the efficacy of a layer comprising non-reversible phase transformation material in reducing ballistic impact damage.

What is claimed is:

1. A ballistic resistant article comprising at least one first layer facing a projectile and at least one second layer adjacent to the at least one first layer and facing an object to be protected wherein the at least one first layer comprises hBN.

2. The article of claim 1 wherein the at least one second layer comprises metal, ceramic, fibrous yarn or polymeric tape, the fibrous yarn or polymeric tape having a tenacity of at least 10 g/dtex (9 g/denier).

3. The article of claim 1 wherein the thickness of the at least one first layer is from 0.1 to 75 mm.

4. The article of claim 3 wherein the thickness of the at least one first layer is from 0.1 to 5 mm.

5. The article of claim 1 wherein the at least one first layer comprises a blend of non-reversible phase transformable material and a thermoset or thermoplastic polymeric resin wherein the polymer comprises up to 85 weight percent of the blend.

6. The article of claim 1 optionally comprising at least one third layer, the third layer being adjacent to the at least one second layer and facing an object to be protected wherein the at least one third layer comprises filaments of aromatic polyamide, aromatic copolyamide, ultra high molecular weight polyethylene (UHMWPE), polyazole, glass or non-filamentary UHMWPE tape.

7. The article of claim 1 optionally comprising a multi-hit protection fourth layer positioned in front of the first layer.

8. The article of claim 7 comprising a non-ballistic energy impact protection layer positioned in front of the fourth layer.

9. The article of claim 1 comprising a non-ballistic energy impact protection layer positioned in front of the at least one first layer.

* * * * *